US008698692B2

(12) United States Patent
Lettkeman

(10) Patent No.: US 8,698,692 B2
(45) Date of Patent: *Apr. 15, 2014

(54) APPARATUS FOR MOUNTING AN OBJECT TO A RAILING

(71) Applicant: DISH Network, L.L.C., Englewood, CO (US)

(72) Inventor: David Lettkeman, Parker, CO (US)

(73) Assignee: Dish Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,304

(22) Filed: May 13, 2013

(65) Prior Publication Data

US 2013/0256480 A1 Oct. 3, 2013

Related U.S. Application Data

(63) Continuation of application No. 12/711,103, filed on Feb. 23, 2010, now Pat. No. 8,462,075.

(51) Int. Cl.
*H01Q 1/12* (2006.01)
*H01Q 1/08* (2006.01)

(52) U.S. Cl.
USPC .......................... 343/878; 343/880; 343/882

(58) Field of Classification Search
None
See application file for complete search history.

(56) References Cited

U.S. PATENT DOCUMENTS

| | | | |
|---|---|---|---|
| 1,994,998 A | 3/1935 | Hull | |
| 3,347,505 A | 10/1967 | Menser | |
| 3,728,796 A | 4/1973 | Lobaugh | |
| 4,203,639 A | 5/1980 | Mohr et al. | |
| 4,358,096 A | 11/1982 | Paton et al. | |
| 4,361,375 A | 11/1982 | Bailey et al. | |
| 4,500,064 A | 2/1985 | Calabro | |
| 4,535,689 A * | 8/1985 | Putkowski | 100/214 |
| 4,546,549 A | 10/1985 | Duperon | |
| 4,589,213 A | 5/1986 | Woodward | |
| 4,598,297 A | 7/1986 | Hawkins | |

(Continued)

FOREIGN PATENT DOCUMENTS

| | | |
|---|---|---|
| JP | 2000-049516 A | 2/2000 |
| JP | 2002-374108 A | 12/2002 |
| KR | 2000-0047707 A | 7/2000 |

OTHER PUBLICATIONS

Author Unknown, "BMI Measuring Instruments," Accessed on Mar. 13, 2011, 9 pages.

(Continued)

*Primary Examiner* — Trinh Dinh
(74) *Attorney, Agent, or Firm* — Kilpatrick Townsend & Stockton LLP

(57) ABSTRACT

Apparatus are described for mounting an object to a structure having a railing. The apparatus includes a base attachable to the object and configured for placement on the structure proximate the railing. The apparatus further includes an adjustable compression mechanism positioned between the base and the railing configured to secure the base to the structure with a selected force. The mechanism includes a first plate on the base, a second plate movable relative to the first plate for producing a selected height of the mechanism and a threaded member attached to the first plate and the second plate. The threaded member is configured to move the second plate relative to the first plate to achieve the selected height and apply the selected force.

20 Claims, 6 Drawing Sheets

(56) References Cited

U.S. PATENT DOCUMENTS

| | | | |
|---|---|---|---|
| 4,698,640 A | 10/1987 | Redman | |
| 4,850,114 A * | 7/1989 | Vockins | 33/526 |
| 4,858,865 A * | 8/1989 | Schrepfer | 248/188.2 |
| 4,888,875 A | 12/1989 | Strother | |
| 4,908,949 A | 3/1990 | Jaccard | |
| 4,934,706 A | 6/1990 | Marshall | |
| 5,063,679 A | 11/1991 | Schwandt | |
| 5,149,277 A | 9/1992 | LeMaster | |
| 5,154,000 A | 10/1992 | Mahoney et al. | |
| 5,167,075 A | 12/1992 | Weldy et al. | |
| 5,306,165 A | 4/1994 | Nadeau | |
| 5,359,820 A | 11/1994 | McKay | |
| 5,574,256 A | 11/1996 | Cottone | |
| 5,617,680 A | 4/1997 | Beatty | |
| 5,886,673 A | 3/1999 | Thomas | |
| 5,963,010 A | 10/1999 | Hayashi et al. | |
| 5,963,179 A | 10/1999 | Chavez | |
| 5,974,218 A | 10/1999 | Nagasaka et al. | |
| 6,180,878 B1 | 1/2001 | Gretz | |
| 6,262,691 B1 | 7/2001 | Austin et al. | |
| 6,273,377 B1 | 8/2001 | Archer | |
| 6,281,929 B1 | 8/2001 | Fimoff | |
| 6,361,007 B1 | 3/2002 | Oby et al. | |
| 6,375,161 B2 * | 4/2002 | Garceau | 254/126 |
| 6,385,856 B1 | 5/2002 | Godin | |
| 6,396,459 B1 | 5/2002 | Pullman | |
| 6,404,405 B2 | 6/2002 | Wanat | |
| 6,438,751 B1 | 8/2002 | Voyticky et al. | |
| 6,445,361 B2 | 9/2002 | Liu et al. | |
| 6,450,464 B1 | 9/2002 | Thomas | |
| 6,532,675 B2 | 3/2003 | Letourneau | |
| 6,727,861 B2 | 4/2004 | Antoine | |
| 6,734,830 B1 | 5/2004 | Bickham | |
| 6,766,992 B1 | 7/2004 | Parker | |
| 6,768,474 B2 | 7/2004 | Hunt | |
| 6,777,611 B2 | 8/2004 | Ewald et al. | |
| 6,834,435 B2 | 12/2004 | Turner | |
| 6,873,304 B1 | 3/2005 | Malhotra | |
| 6,996,911 B1 | 2/2006 | Dinius | |
| 7,000,746 B2 | 2/2006 | Mackin et al. | |
| 7,027,006 B2 | 4/2006 | Holle | |
| D522,967 S | 6/2006 | St. Clair | |
| 7,057,575 B2 | 6/2006 | Malhotra | |
| 7,106,082 B2 * | 9/2006 | Yoshioka | 324/750.22 |
| 7,106,273 B1 | 9/2006 | Brunson et al. | |
| 7,122,738 B2 | 10/2006 | Kanamaru | |
| 7,220,129 B1 | 5/2007 | Nishijima et al. | |
| 7,253,785 B2 | 8/2007 | Holle | |
| 7,260,920 B2 | 8/2007 | Weir | |
| 7,435,901 B2 | 10/2008 | Mori et al. | |
| 7,456,802 B1 | 11/2008 | Bourgeois | |
| 7,460,081 B2 | 12/2008 | Holle | |
| 7,554,036 B1 | 6/2009 | DeCosta | |
| 7,563,131 B2 | 7/2009 | Sullivan et al. | |
| 7,592,719 B2 | 9/2009 | Hoopes | |
| D603,342 S | 11/2009 | DeCosta | |
| 7,648,379 B2 | 1/2010 | Johnson et al. | |
| 7,651,353 B2 | 1/2010 | Laukhuf | |
| 7,683,853 B2 * | 3/2010 | Michaelis | 343/878 |
| 7,692,094 B1 | 4/2010 | DeCosta | |
| 7,741,562 B2 | 6/2010 | Crotinger et al. | |
| D632,545 S | 2/2011 | DeCosta | |
| 7,918,425 B2 | 4/2011 | Rathbone et al. | |
| 7,997,546 B1 | 8/2011 | Andersen et al. | |
| 8,011,628 B1 | 9/2011 | Suddeth | |
| 8,015,929 B2 | 9/2011 | Tyner | |
| D647,488 S | 10/2011 | DeCosta | |
| 8,081,139 B2 * | 12/2011 | Schmidt et al. | 343/878 |
| 8,336,221 B2 | 12/2012 | Steele et al. | |
| 8,339,329 B2 | 12/2012 | Shen | |
| 8,350,153 B1 | 1/2013 | DeCosta | |
| D678,840 S | 3/2013 | DeCosta | |
| D684,935 S | 6/2013 | DeCosta | |
| 8,462,075 B2 * | 6/2013 | Lettkeman | 343/882 |
| 2002/0003504 A1 * | 1/2002 | Yoshida et al. | 343/892 |
| 2002/0067591 A1 | 6/2002 | Tajima | |
| 2002/0105476 A1 | 8/2002 | Overton | |
| 2002/0190172 A1 | 12/2002 | Oddsen, Jr. | |
| 2004/0149475 A1 | 8/2004 | Gorin | |
| 2004/0248462 A1 | 12/2004 | Dyer et al. | |
| 2005/0001781 A1 | 1/2005 | Antoine | |
| 2005/0101183 A1 | 5/2005 | McCoy et al. | |
| 2005/0250375 A1 | 11/2005 | Allison | |
| 2006/0067066 A1 | 3/2006 | Meier et al. | |
| 2008/0117091 A1 | 5/2008 | Binder | |
| 2008/0233794 A1 | 9/2008 | Clark et al. | |
| 2009/0052122 A1 | 2/2009 | Johnson et al. | |
| 2009/0056970 A1 | 3/2009 | Hoffman et al. | |
| 2009/0067621 A9 | 3/2009 | Wajs | |
| 2009/0124113 A1 | 5/2009 | Sexton et al. | |
| 2009/0315804 A1 | 12/2009 | Schmidt et al. | |
| 2010/0046194 A1 | 2/2010 | Yang et al. | |
| 2010/0075540 A1 | 3/2010 | Liao | |
| 2010/0141379 A1 | 6/2010 | Tucker et al. | |
| 2010/0147580 A1 | 6/2010 | Koesterich | |
| 2010/0177010 A1 * | 7/2010 | Michaelis | 343/882 |
| 2010/0219183 A1 | 9/2010 | Azancot et al. | |
| 2011/0021066 A1 | 1/2011 | Squires | |
| 2011/0032175 A1 | 2/2011 | Kang | |
| 2011/0083399 A1 | 4/2011 | Lettkeman et al. | |
| 2011/0187624 A1 | 8/2011 | Lettkeman et al. | |
| 2011/0205142 A1 | 8/2011 | Lettkeman | |
| 2011/0259883 A1 | 10/2011 | DeCosta | |
| 2012/0137530 A1 | 6/2012 | Yun | |
| 2012/0151785 A1 | 6/2012 | Lettkeman et al. | |
| 2012/0162044 A1 | 6/2012 | Lettkeman et al. | |
| 2012/0256496 A1 | 10/2012 | DeCosta | |
| 2012/0256809 A1 | 10/2012 | Lettkeman | |
| 2012/0261529 A1 | 10/2012 | Lettkeman | |
| 2013/0056259 A1 | 3/2013 | Lettkeman | |

OTHER PUBLICATIONS

Author Unknown, "Stanley Hand Tools, 77-009—IntelliPoint Plus Level," Accessed Mar. 13, 2011. 1 page.
Author Unknown, "Checkpoint U6 V-Groove Level," Chads Tool Box.com, Accessed Mar. 13, 2011, 6 pages.
Midlite Corporation, "The Power Jumper, HDTV Power Relocation Kit," Nov. 10, 2011, www.Midlite.com, 1 page.
Powerbridge, "3D Power Cable Total Solution Connector Kit Model #TSCK Power Extension Cable Management," 2 pages.
"Powerbridge In-Wall Power Extension System Home," accessed at http://www.powerbridgesolution.ocm on Sep. 17, 2011, 4 pages.
Legrand, "Flat Screen TV Cord and Cable Power Kit—CMK70," 2011, 1 page.
Author Unknown, Treestand Manual, Locon Treestands, LLC, Waterford, Ohio, known to exist on Oct. 13, 2009, 2 pages. Accessed at: http://www.locontreestands . . . .
International Search Report and Written Opinion of PCT/US2010/052431, mailed Jun. 10, 2011, 7 pages.
Home Depot, "PowerBridge Ultra Low Profile In-Wall System", Oct. 18, 2013, 2 pages. Retrieved from: http://www.homedepot.com/catalog/pdfImages/ef/ef60a932-d90e-4a49aa33-576da0d6feb6.pdf.
Sewell, "DataComm Flat Panel TV Cable Organizer Remodeling Kit with Power Outlet", known to exist Nov. 1, 2013, 3 pages. Retrieved from: http://sewelldirect.com/Recessed-Cable-Plate-Remodeling-Kit-with-Electrical-Outlet.asp.

* cited by examiner

APPARATUS FOR MOUNTING AN OBJECT TO A RAILING

CROSS REFERENCE TO RELATED APPLICATION

This application is a continuation of U.S. patent application Ser. No. 12/711,103 filed Feb. 23, 2010, now U.S. Pat. No. 8,462,075, entitled "Apparatus for Mounting an Object to a Railing," the entirety of which is hereby incorporated by reference for all intents and purposes.

BACKGROUND

Small satellite dishes may be mounted to the outside of a structure, such as a home and allow a viewer to receive communication services, such as television programming, via a communication satellite. When mounted on a single family dwelling, the satellite antenna is typically mounted to a wall or roof of the structure. For example, the satellite antenna may be attached to a side wall of the structure through one or more threaded fasteners. However, in a multiple dwelling unit (MDU) installation, the user often does not have authorization to attach objects, such as a satellite antenna, to the outside of the structure via threaded fasteners or the like. Thus, it is desirable to mount the satellite antenna on a porch area without fastening any components to walls, the floor or railing using screws, nails or the like.

BRIEF DESCRIPTION OF THE DRAWINGS

The same number represents the same element or same type of element in all drawings.

DETAILED DESCRIPTION OF THE DRAWINGS

Figure 1:
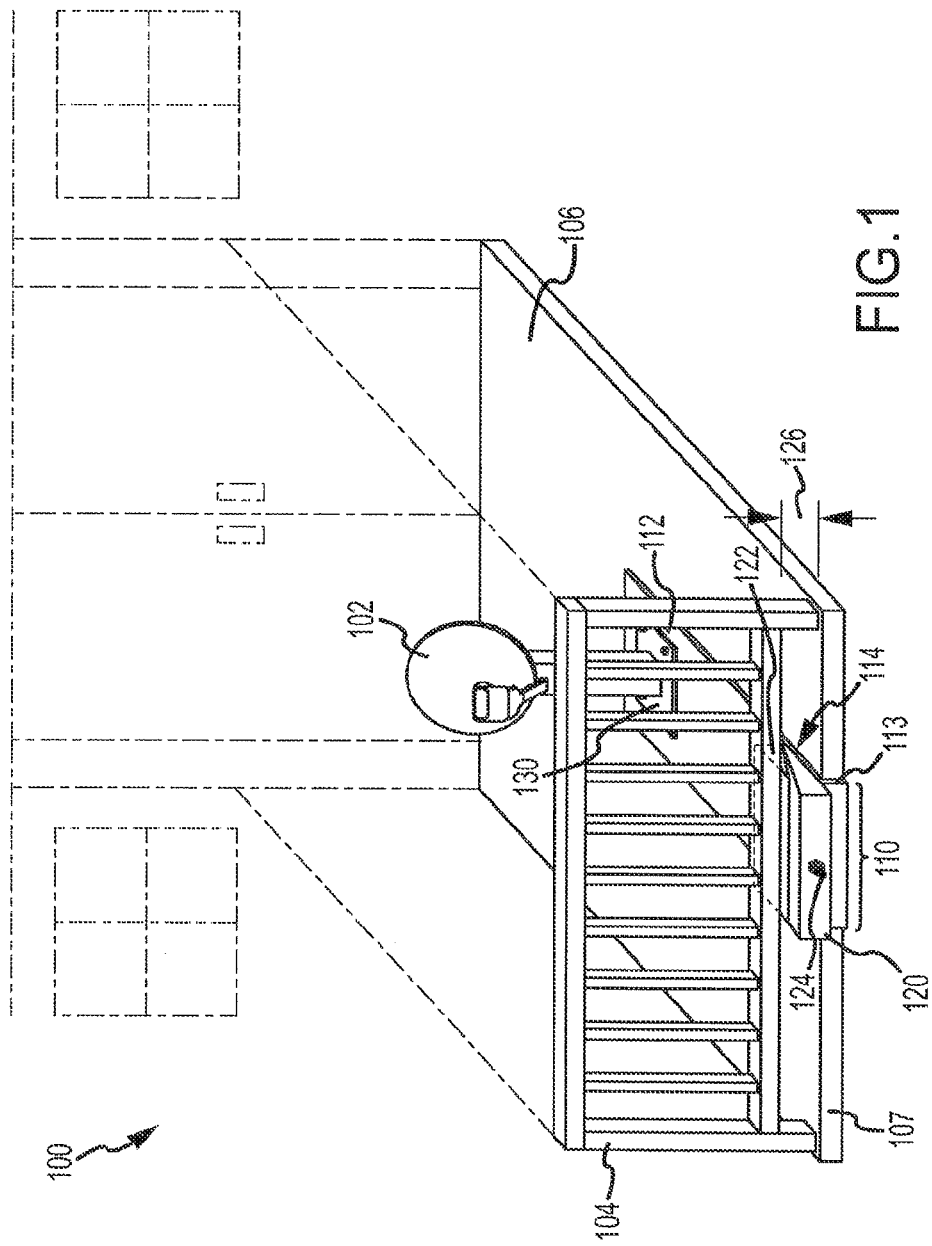
FIG. 1 illustrates a front isometric view of an environment including a satellite antenna mounted to a railing of a structure.

Described herein are systems, methods and apparatus for mounting objects to a railing. More particularly, described herein are pressure mounts that secure an object to a railing of a structure without fasteners, adhesives or the like that may permanently damage the railing of a structure. The pressure mount fits between two pieces of a structure, such as a floor and a railing, and applies force to both pieces in order to secure the object to the structure. Thus, the object is prevented from moving once the pressure mount is engaged. Furthermore, the pressure mount is adjustable to fit in different spaces, allowing use in various mounting situations.

At least one embodiment described herein provides a system for mounting an object to a railing. The system includes a base and an adjustable compression mechanism. The base is attachable to the object and configured for placement on the structure proximate the railing. The adjustable compression mechanism is positioned between the base and the railing and configured to secure the base to the structure with a selected force. The mechanism includes a first plate on the base and a second plate movable relative to the first plate for producing a selected height of the mechanism. The mechanism also includes a threaded member attached to the first plate and the second plate configured to move the second plate relative to the first plate to achieve the selected height and apply the selected force.

The adjustable compression mechanism may take various forms of devices that are configurable to provide adjustable heights for varying types of railings and provide the securing forces described above. In at least one embodiment, the adjustable compression mechanism comprises a plurality of opposing wedges secured together by a threaded member. The combined height of the wedges may be adjusted by applying a torque to the threaded member. Thus, the wedges may be adjusted to fit varying types or heights of railings and secure an object thereunder. In another embodiment, the adjustable compression mechanism comprises a jack, such as a scissor jack or jackscrew which may be adjusted to varying heights to secure the base in place underneath the lower portion of a railing.

Embodiments of the pressure mount will be described in the context of securing a satellite antenna. Furthermore, the embodiments will be described in the context of securing a satellite antenna to a porch of a structure. However, it is to be appreciated that the techniques described herein may be applied to mount any type of object to any type of railing on any type of structure. Examples of mounted objects include flag poles, security cameras, sporting equipment and the like. Furthermore, the term "satellite antenna" is used herein generally to describe all of the components of an outdoor satellite reception system, including the satellite antenna mast and foot, the satellite antenna reflector (e.g., the "satellite dish") and the low noise block downconverter (LNBF), which is also known as a satellite antenna.

Figure 2:
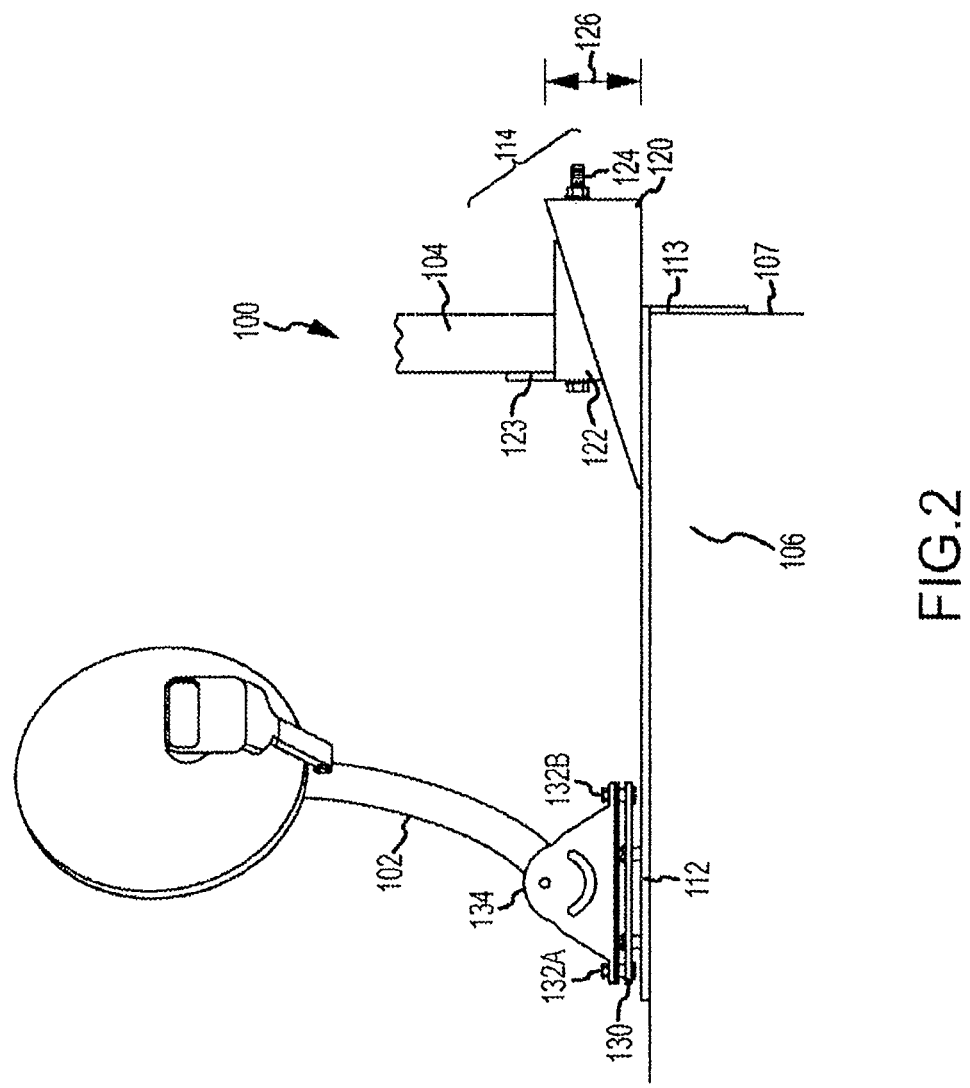
FIG. 2 illustrates a side view of the environment of FIG. 1.
Figure 3:
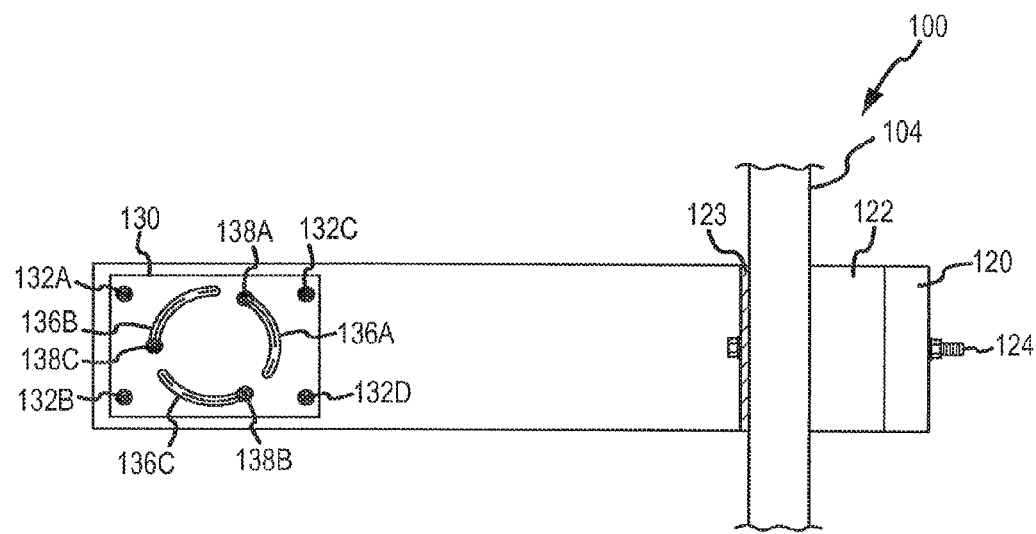
FIG. 3 illustrates a top plan view of the environment of FIG. 1.

FIG. 1 illustrates a front isometric view of an environment 100 including a satellite antenna 102 mounted to a railing 104 of a structure. FIG. 2 illustrates a side view of the environment 100 of FIG. 1. FIG. 3 illustrates a top plan view of the environment 100 of FIG. 1.

As illustrated in FIGS. 1-3, the satellite antenna 102 is installed on a porch of a multiple dwelling unit (MDU). More particularly, the satellite antenna 102 is mounted between the floor 106 and the railing 104 of the porch using the pressure mount system 110. The mounting system 110 secures the satellite antenna 102 to the railing 104 of the structure, such that movement of the satellite antenna 102 due to external forces, such as wind, rain, snow or contact with other objects, is prevented. Because satellite communications depend on a direct line of sight between a satellite antenna 102 and an orbiting satellite (not shown), it is important that alignment of the satellite antenna 102 and the satellite is not disturbed.

In the illustrated embodiment of FIG. 1, the mounting system 110 includes a base 112 and an adjustable compression mechanism 114. The base 112 is attachable to the satellite antenna 102 and configured for placement on the floor 106 proximate the railing 104. As illustrated in FIG. 1, the base 112 includes an optional flange 113 configured to secure the 112 base against an edge 107 of the floor 106. Thus, the base 112 is prevented from movement towards the interior of the porch (e.g., towards the doors of the dwelling).

In at least one embodiment, the adjustable compression mechanism 114 is positioned between the base 112 and the railing 104 and configured to secure the base 112 to the structure with a selected force. The adjustable compression mechanism 114 includes a first plate 120 on the base 112 and a second plate 122 movable relative to the first plate 120 for producing a selected height 126 (see FIG. 2) of the mechanism. The first and second plates 120 and 122 are secured together by a threaded member 124 attached to the first plate 120 and the second plate 122. The threaded member 124 is further configured to move the second plate 122 relative to the first plate 120 to achieve the selected height 126 and apply the selected force.

In the illustrated embodiment, the first and second plates 120 and 122 are embodied as a plurality of wedges 120 and 122 utilized to apply pressure to both the railing 104 and the floor 106. The second wedge 122 is slidably mounted to the first wedge 120. The height 126 of the first and second wedges 120 and 122 may be adjusted by varying the position of the second wedge 122 proximate the first wedge 120.

More particularly, the position of the second wedge 122 may be adjusted by rotating the threaded member 124, sliding the second wedge 122 along the inclined surface of the first wedge 120. By varying the height 126, the mounting system 110 may be utilized in various installation environments 100. For example, the height 126 may be varied to allow the first wedge 120, the second wedge 122 and the base 112 to fit in any sized space between the railing 104 and the floor 106. The first wedge 120, the second wedge 122 and the base 112 apply a first force to the railing 104 and a second force to the floor 106 such that satellite antenna 102 is prevented from movement caused by external forces.

Referring to FIG. 2, in at least one embodiment, the second wedge 122 includes a flange 123 positioned on a top surface. The flange 123 is configured to secure the second wedge 122 against the railing 104. Thus, slippage of the second wedge 122 beyond the railing 104 in a direction towards the dwelling is prevented.

As further illustrated in FIG. 2, the base 112 includes an optional rotatable plate 130 attached to the satellite antenna 102. The rotatable plate 130 secures the satellite antenna 102 to the base 112. By rotating the plate 130, the satellite antenna 102 may be positioned in a plurality of orientations. Thus, an installer may configure the satellite antenna 102 to point towards a desired orbiting satellite to receive television programming therefrom. In at least one embodiment, the rotatable plate 130 includes a plurality of threaded fasteners 132A-132D (see FIGS. 2 and 3) for attaching the rotatable plate 130 to a foot 134 of the satellite antenna 102.

As illustrated in the top plan view of FIG. 3, the rotatable plate 130 includes a plurality of openings 136A-136C which allow the plate 130 to rotate about a plurality of threaded, members 138A-138C. Each threaded member 138A-138C is comprised of a bolt and a corresponding socket configured to receive the bolt. The sockets are attached to the base 112. The bolts can be loosened or tightened to allow rotation of the plate 130 about the threaded members 138A-138C. Once the rotatable plate 130 is aligned into a desired position, the threaded members are tightened to lock the plate 130 in place.

Figure 4:
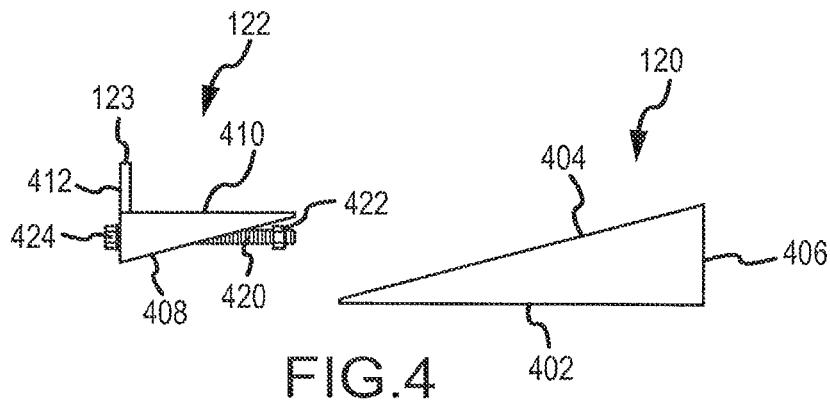
FIG. 4 illustrates an exploded side view of the adjustable compression mechanism of FIG. 1.

FIG. 4 illustrates an exploded side view of the adjustable compression mechanism 114 of FIG. 1. As illustrated in FIG. 4, the first wedge 120 includes a bottom planar surface 402, a top inclined surface 404 and a first side planar surface 406. The second wedge 122 includes a bottom inclined surface 408, a top planar surface 410 and a second side planar surface 412. As illustrated in FIG. 4, the second wedge 122 optionally includes a flange 123 along the top planar surface 410 configured to secure the second wedge 122 against the railing 104. The threaded member 124 includes a bolt 420 and a plurality of nuts 422 and 424. The nuts 422 and 424 may be tightened to secure the first and second wedges 120 and 122 therebetween.

Figure 5:
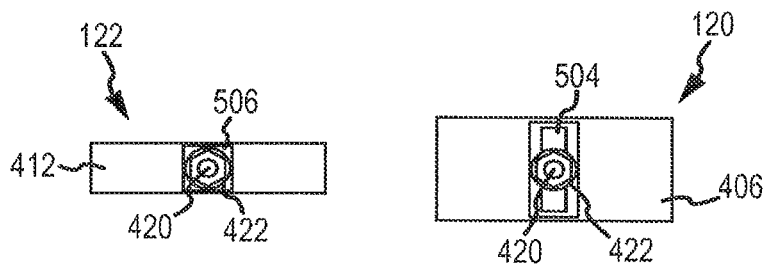
FIG. 5 illustrates end views of the adjustable compression mechanism of FIG. 1.

FIG. 5 illustrates end views of the adjustable compression mechanism 114 of FIG. 1. As illustrated in FIG. 5, the first side planar surface 406 of the first wedge 120 includes a first opening 504 configured to receive the threaded member 124. Similarly, the second side planar surface 412 of the second wedge 122 includes a second opening 506 also configured to receive the threaded member 124.

Figure 6:
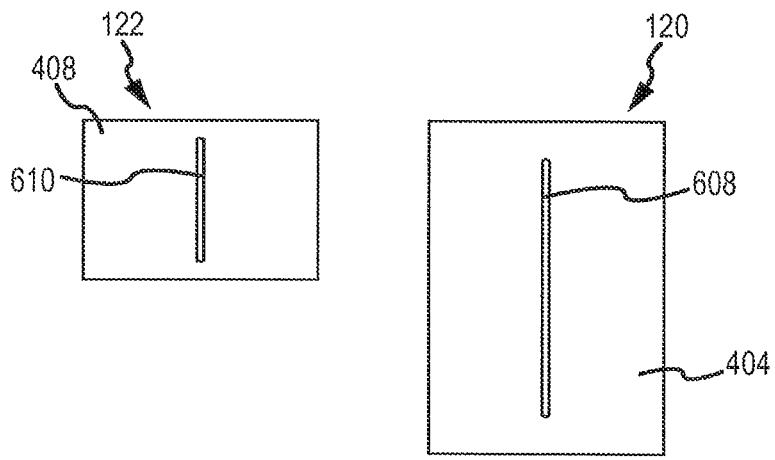
FIG. 6 illustrates top plan views of the adjustable compression mechanism of FIG. 1.

FIG. 6 includes top plan views of the adjustable compression mechanism 114 of FIG. 1. The top inclined surface 404 of the first wedge 120 includes a third opening 608, corresponding with the first opening 504, configured to receive the threaded member 124. Similarly, the bottom inclined surface 408 of the second wedge 122 includes a fourth opening 610, corresponding with the second and third openings 504 and 606, configured to receive the threaded member 124.

The threaded member 124 is configured to pass through each of the openings 504, 506, 608 and 610 and secures both wedges 120 and 122 therebetween. Furthermore, as the threaded member 124 is tightened, the second wedge 122 moves relative to the first wedge 120, allowing a user to adjust the combined height 126 (sec FIG. 2) of the wedges 120 and 122.

Figure 7:
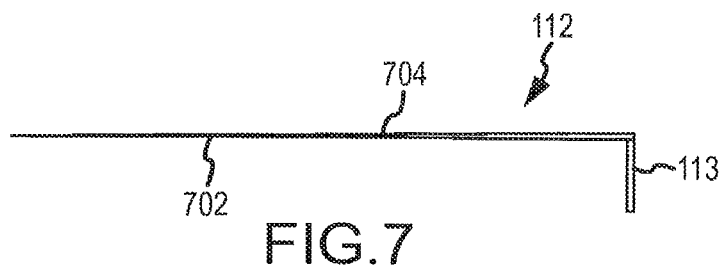
FIG. 7 illustrates a side view of the base of FIG. 1.

FIG. 7 illustrates a side view of the base 112 of FIGS. 1-3. The base is comprised of an elongated plate having a first planar surface 702, a second planar surface 704 and a flange 113. The first planar surface 702 is configured to contact a floor 106 (see FIG. 1) of the structure. The second planar surface 704 is configured to contact the first wedge 120 (see FIG. 1). In at least one embodiment, the base 112 and the first wedge 120 may be attached together and form a single component. The flange 113 is configured to contact the edge 107 of the floor and prevents slippage of the base 112 in a direction towards the interior of the structure.

The mounting system 110 described in FIGS. 1-7 allows for an object, such as the satellite antenna 102 (see FIG. 1) to be mounted between an opening of a structure. The compression mechanism 114 may be adjusted to fit any size space for mounting an object thereupon. Furthermore, an object may be mounted to a structure without the use of threaded fasteners which are inserted into the structure or railing, thus, preventing permanent damage to the structure and railing.

As described above, the adjustable compression mechanism 114 may be alternatively embodied in other forms than the wedges 120 and 122 illustrated in FIGS. 1-7. For example, the adjustable compression mechanism 114 may alternatively be embodied as a scissor jack, which may be adjusted to fit the size of the opening between the base 112 and the railing in a manner similar to the wedges 120 and 122.

Figure 8:
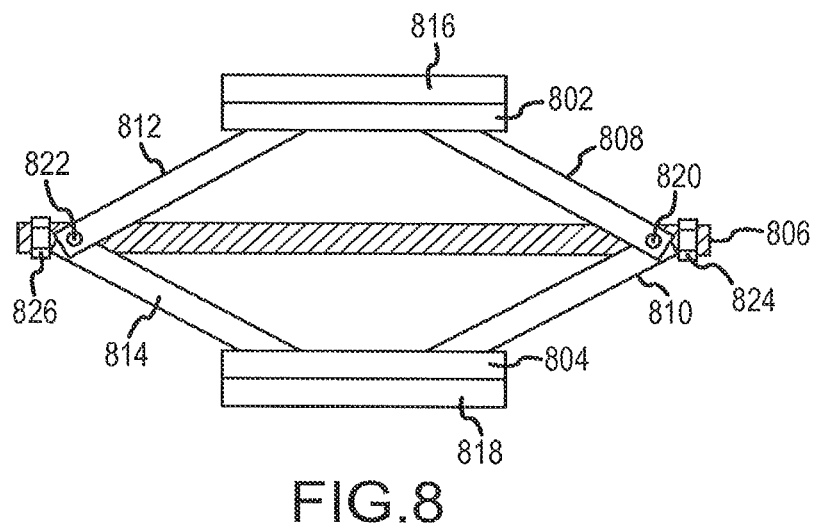
FIG. 8 illustrates a front view of the adjustable compression mechanism of FIG. 7 embodied as a scissor jack.
Figure 9:
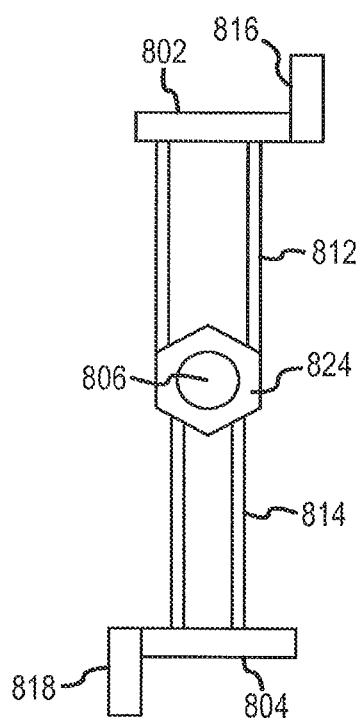
FIG. 9 illustrates a side view of the scissor jack of FIG. 8.

FIG. 8 illustrates a front view of the adjustable compression mechanism of FIG. 7 embodied as a scissor jack 800. FIG. 9 illustrates a side view of the scissor jack 800 of FIG. 8. The scissor jack 800 includes a first plate 802, a second plate 804, a threaded member 806, a plurality of moveable arms 808, 810, 812 and 814, a first flange 816, a second flange 818, a first pin 820, a second pin 822, a first locking mechanism 824 and a second locking mechanism 826. Each of these components is discussed in greater detail below. The scissor jack 800 may include other components, elements or devices not illustrated for the sake of brevity.

The first plate 802 is configured to interface with the railing 104 (see FIG. 1) and provide a first force on the railing 104. The second plate 804 is configured to interface with the base 112 and provide a second force on the base 112 and the floor 106. A first moveable arm 808 is positioned between the first plate 802 and the first pin 820. A second moveable arm 810 is positioned between the second plate 804 and the first pin 820. Similarly, the second moveable arm 812 is positioned between the first plate 802 and the second pin 822 and the second moveable arm 814 is positioned between the second plate 804 and the second pin 822. Each of the moveable arms 808-814 is rotatably connected to one of the plate 802 and 804 and one of the pins 820 and 822.

The arms 808-814 are moved by rotating the threaded member 806. Thus the second plate 804 moves in a vertical direction relative to the first plate 804 responsive to a torque applied to the threaded member 806. The position of the second plate 802 may be locked in place by engaging the locking mechanisms 824 and 826. In at least one embodiment, the locking mechanisms 824 and 826 comprise nuts that are tightened to secure the moveable arms 808-814 in place, locking the position of the plate 802.

Similar to wedge compression mechanism 114 described in FIGS. 1-7, the scissor jack 800 is adjusted to fit within a space between a railing 104 (see FIG. 1) and the base 112. Thus, the first and second plates 802 and 804 apply a first force to the base 112 and a second force to the railing 104, securing the base 112 to the railing 104. Thus, a mounted object, such as the satellite antenna 102, is prevented from movement while the scissor jack 800 is engaged.

Referring to FIG. 9, the flanges 816 and 818 are positioned on opposing sides of the scissor jack 800 and are configured to secure the scissor jack 800 in place under the railing 104 (see FIG. 1). More particularly, the first flange 816 is configured to secure the scissor jack 800 against the railing 104 and the second flange 818 is configured to secure the scissor jack 800 against the floor 106 and/or the base 112. Thus, the flanges 816 and 818 provide additional forces to secure the scissor jack 800 in place when engaged to mount the satellite antenna 102.

Figure 10:
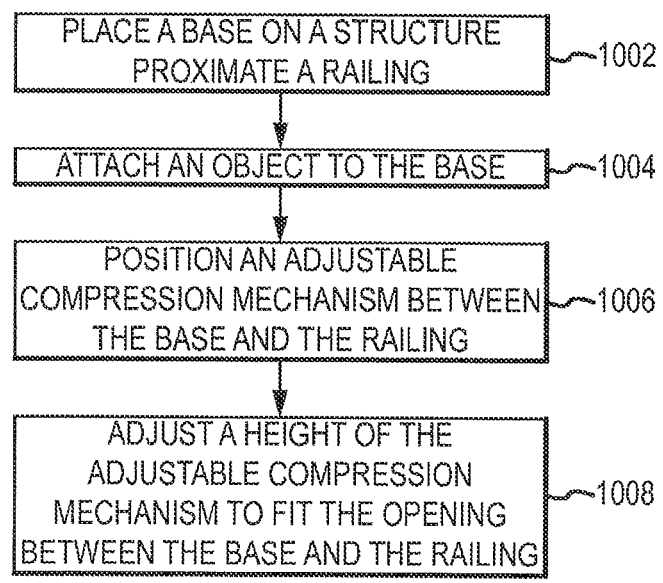
FIG. 10 illustrates an embodiment of a process for mounting an object to a structure.

FIG. 10 illustrates an embodiment of a process for mounting an object to a structure. More particularly, the process of FIG. 10 will be described in the context of mounting an object to a railing. However, it is to be appreciated that the mounting process may be utilized to secure an object to any type of opening on a structure. The process of FIG. 10 may include other operations not illustrated for the sake of brevity.

The process includes placing a base on a structure proximate a railing (operation 1002). In at least one embodiment, the structure comprises a floor and the base is placed in an opening between the floor and the railing. The process further includes attaching an object to the base (operation 1004). For example, the object may comprises-satellite antenna which is attached to the base.

The process further includes positioning an adjustable compression mechanism between the base and the railing (operation 1006). The process further includes adjusting a height of the adjustable compression mechanism to fit the opening between the base and the railing (operation 1008). In at least one embodiment, the adjustable compression mechanism includes a threaded member which may be rotated in order to adjust the height of the adjustable compression mechanism. When adjusted to a selected height, the adjustable compression mechanism applies a selected force to the railing and the floor that secures the base in place and thus, mounts the object to the railing.

Although specific embodiments were described herein, the scope of the invention is not limited to those specific embodiments. The scope of the invention is defined by the following claims and any equivalents therein.

What is claimed is:

1. A method for mounting an object to a structure, comprising:
   positioning a base proximate a railing in an opening between the structure and the railing;
   positioning a mechanism between the base and the railing, the mechanism configured to secure the base to the structure with a selected force and comprises a first plate, a second plate movable relative to the first plate for producing a selected height of the mechanism, and a threaded member attached to the first plate and the second plate configured to move the second plate relative to the first plate to achieve the selected height and apply the selected force;
   adjusting a height of the mechanism to fit the opening between the base and the railing; and
   attaching the object to the base thereby mounting the object to the structure.

2. The method of claim 1, further comprising adjusting the threaded member to adjust the height of the mechanism to fit the opening between the base and the railing, wherein the first plate and the second plate comprise wedges and the second plate is slidably mounted to the first plate.

3. The method of claim 1, wherein the first plate is attached to the base.

4. The method of claim 1, wherein the structure comprises a floor, and the first plate, second plate, and base fit in a space between the railing and the floor, and adjusting the height of the mechanism applies a first force to the railing and a second force to the floor.

5. The method of claim 4, wherein the base further includes a flange configured to secure the base against an edge of the floor.

6. The method of claim 1, wherein the threaded member comprises a bolt placed through openings in the first plate and the second plate and a nut threaded to the bolt.

7. The method of claim 1, wherein the threaded member is at least a portion of a scissor jack between the first plate and the second plate.

8. The method of claim 1, wherein the first and second plates include flanges on opposing sides configured to secure the mechanism against the railing.

9. The method of claim 1, wherein the base comprises a plate having a first planar surface configured to contact a floor of the structure, an opposing second surface, and a rotatable plate attached to the second surface.

10. The method of claim 9, wherein the object comprises a satellite antenna and a foot of the satellite antenna couples to the rotatable plate, the rotatable plate configured to position the satellite antenna in a plurality of orientations.

11. The method of claim 1, wherein the second plate further includes a flange along a top surface configured to secure the second plate against the railing.

12. A method, comprising:
   providing a base attachable to an object configured for placement on a structure proximate a railing, wherein a first wedge on the base and a second wedge are configured for placement between the railing and the base and to secure the base to the structure with a selected force, the second wedge movable relative to the first wedge for producing a selected height of the first wedge and the second wedge; and
   adjusting a threaded member attached to the first wedge and the second wedge to move the second wedge relative to the first wedge to achieve the selected height and apply the selected force.

13. The method of claim 12, wherein the mounted object comprises a satellite antenna.

14. The method of claim 13, wherein the base further comprises a rotatable plate configured to attach to the satellite antenna, the rotatable plate configured to position the satellite antenna in a plurality of orientations.

15. The method of claim 14, wherein the rotatable plate comprises a plurality of fasteners configured to attach to a foot of the satellite antenna and secure the satellite antenna to the base.

16. The method of claim 12, wherein the first wedge is attached to the base.

17. The method of claim 12, wherein the structure comprises a floor, and the first wedge, second wedge, and base fit in a space between the railing and the floor and apply a first force to the railing and a second force to the floor.

18. The method of claim 12, wherein the base further includes a flange along an end proximate the railing configured to secure the base against an edge of the floor.

19. The method of claim 12, wherein the second wedge further includes a flange along a top surface configured to secure the second wedge against the lower railing.

20. A system for mounting a satellite antenna to a structure having a railing, comprising:
  a base attachable to the satellite antenna configured for placement on a floor of the structure proximate the railing;
  a first wedge and a second wedge, the first wedge, second wedge, and base configured to fit in a space between the floor and the railing and to secure the base to the structure with a first force applied to the railing and a second force applied to the floor, the second wedge movable relative to the first wedge for producing a selected height of the first wedge and the second wedge; and
  a threaded member attached to the first wedge and the second wedge configured to move the second wedge relative to the first wedge to achieve the selected height and apply the first and second forces.

* * * * *